Jan. 28, 1964     H. N. BRAUNHUT     3,119,195
OCULAR TOY DEVICE
Filed May 19, 1961

INVENTOR.
HAROLD N. BRAUNHUT
BY
Friedman & Goodman
ATTORNEYS

United States Patent Office 3,119,195
Patented Jan. 28, 1964

3,119,195
OCULAR TOY DEVICE
Harold N. Braunhut, 1812 Atlantic Ave.,
Brooklyn 33, N.Y.
Filed May 19, 1961, Ser. No. 111,293
2 Claims. (Cl. 46—1)

The present invention relates in general to an ocular toy device of the type which produces a novel effect when the device is viewed from a different standpoint or point of view so as thereby to create an illusion of movement and, in particular, to such devices which exhibit at each viewing a plurality of different or discrete effects, the movements of which must be related when viewed from different standpoints or points of view.

Devices of the type to which the present invention relates comprise a single or compound sheet of transparent material provided on one face thereof with a series of parallel ribs of convex cross-section with little or no spacing between them. These ribs constitute segments of optical cylinders which form lens elements. At the back of the sheet, provision is made for a multiple-part figure for displaying composed of a plurality of sets of parallel lines, one set for each part. The lines of each set are spaced apart to correspond to the central longitudinal axes of the ribs and the lines of one set are interposed between the lines of another set and vary therefrom either in color or character or both.

In order to produce certain types of novelty effects, such as for example, a pair of moving or blinking eyes, it is necessary to provide a plurality of multi-part figures, each figure representing the open and closed position of one eye so as to provide for an eye blinking effect as the figures are viewed from different standpoints. Heretofore, each multiple-part figure representing one eye was placed in the separate section of an eyeglass frame. However, it was practically impossible heretofore to provide for the necessary alignment and synchronization of both figures so that both eyes would appear to close or open or blink in synchronization or at the same time.

In view of the foregoing, it is an object of the present invention to obviate or eliminate the disadvantages and limitations of prior art devices of the character described.

It is another object of the present invention to provide an advertising device or toy of the character described having a plurality of multiple-part figures, wherein the apparent movement of the figures, when viewed from different standpoints, is in synchronization and the figures are in proper alignment.

It is a further object of the present invention to provide a device having provision for obtaining the novelty effect of synchronization of the movement of a plurality of separate multiple-part figures which can be manufactured on a mass production basis at a relatively low cost.

Other and further objects and advantages of the present invention will be readily apparent to one skilled in the art from a consideration of the following specification taken in connection with the appended drawings.

In the drawings which illustrate the best mode presently contemplated for carrying out the invention;

Figure 1:
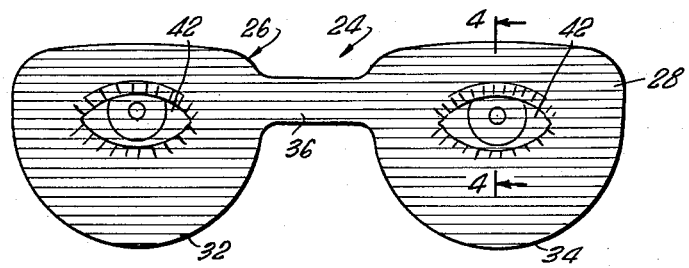
FIGURE 1 is a front elevation of a device pursuant to the present invention provided with a pair of multiple-part figures as observed from one point of view.

Referring now to the drawing in detail, there is shown a pair of toy spectacles or eyeglasses 10 pursuant to the present invention. The eyeglasses 10 comprise an eyeglass or spectacle frame 12 provided with the open lens frames 14 and 16 which are interconnected by a bridge or nose-piece 18. A pair of templets 20 is hingedly connected to the spectacle frame 12. Pursuant to a feature of the present invention, the bridge or nose-piece 18 is provided with a recess or channel 22 at the inner surface thereof which surface is in abutment with the bridge of the wearer's nose when the spectacles are worn.

Figure 2:
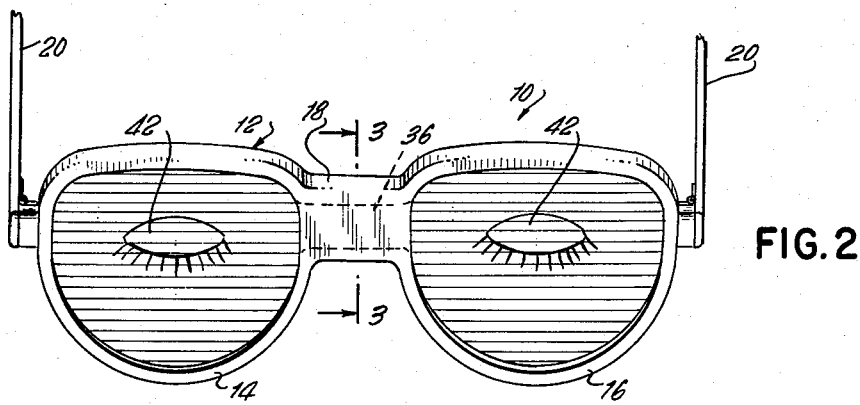
FIGURE 2 is a perspective view of an eyeglass frame provided with the device of FIGURE 1, the multiple-part figures being observed from a different standpoint.
Figure 3:
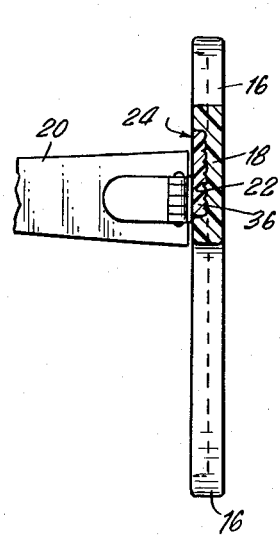
FIGURE 3 is a sectional view on an enlarged scale taken on the line 3—3 of FIGURE 2.

Pursuant to the present invention, the spectacles 10 are intended to provide the novel effect of a pair of blinking eyes when the spectacles are viewed from different viewpoints, or as the wearer moves his head. For this purpose, the frame 12 is provided with the device 24 of the present invention. The device 24 constitutes a lenticular viewing screen 26 which is provided on its front face 28 with a series of very fine contiguous parallel convolutions 30 which constitute segments of optical cylinders forming lens elements. The screen 26 is formed preferably from a transparent plastic sheet and is provided with the laterally related portions 32 and 34 which are interconnected by the integral bridge portion 36. It will be understood that portions 32 and 34 are dimensioned so as to fit or be seated within the frame portions 14 and 16 respectively and the portion 36 is dimensioned to be received within the recess or channel 22 defined in the spectacle nose-piece or bridge 18. In this connection, it will be understood that the spectacle bridge 18 is opaque so that when the bridge portion 36 of the device 24 is seated therein, as best shown in FIGURES 2 and 3, the bridge portion 36 will not be visible from the front of the spectacle as shown in FIGURE 2. Further in this connection, it will be understood that any suitable means are provided for retaining the device 24 within the spectacle 12.

In the present embodiment, the device 24 exhibits the novelty effect or illusion of a pair of blinking or moving eyes. This result is achieved by providing at the rear or planar surface or face 38 of the viewing screen 26 an opaque backing member 40. For each multiple-part eye figure or representation 42, the backing member 40 is provided on its inner surface 44 with a two-part figure which, as will be noted from FIGURE 4, abuts the inner or planar surface 38 of the screen member 26. Each two-part figure is composed of two sets of parallel lines, one set for each part of the figure. In the illustration of the figures in FIGURE 4, the thickness of the lines is exaggerated for the purposes of clarity. The lines of one set 46 represents the open condition of the eye as shown in FIGURE 1 and the lines of the second set 48 represents the closed condition of the eye as shown in FIGURE 2.

Figure 4:
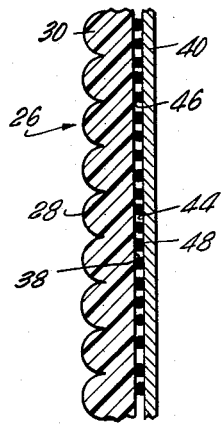
FIGURE 4 is a sectional view on an enlarged scale taken on the line 4—4 of FIGURE 1.

In view of the foregoing, it will be apparent that the backing member 40 constitutes one blank and the viewing screen member 26 constitutes a second blank and when assembled in the position thereof shown in FIGURE 4, both blanks constitute a composite blank which constitutes the device 24. The separate lines 46 and 48 for each of the multi-part figures 42 are applied or formed simultaneously on the blank 40 with the result that said lines are in alignment with the similar lines in each of the multi-part figures 42. Since the screen 26 is a blank formed from a sheet of homogeneous screen material, it will be apparent that the ribs 30 in both portions 32 and 34 of the screen 26 are similar and in alignment throughout each of said portions. Consequently, when the separate lines 46 and 48 are viewed through the similar ribs 30, in each of the different positions or points of view from which they may be observed through the screen 26 or as the wearer moves the spectacles 10, it will be apparent that the eyes 42 will appear to open as in FIGURE 1 and to close as in FIGURE 2 in complete synchronization for both movements for both figures.

It is preferred to form the screen member blank simultaneously with the backing member blank as a laminated unit. This is accomplished by imprinting the figures on a large backing sheet as repeated elements and then laminating said backing sheet to a similar size lenticular screen sheet in appropriate register therewith. Thereupon composite blanks are die-cut from the overall sheet to form multi-part units in which the individual figures are integrally joined by means of a bridging portion. The composite blank may then be mounted as a unit in the manner herein described. The formation of composite laminated sheets of backing and screen material is well known to persons skilled in the art. The integral unit form of the multi-part figure maintains the alignment of all portions of the lenticular screen with all figure portions and thus assures a predetermined synchronization of movement as the aspect or point of view is changed.

While the present invention has been illustrated and described in connection with a pair of multi-part figures which represent open and closed positions or conditions of a pair of eyes, it will be readily apparent that it is not limited to eye movements of a pair of eyes, nor is it limited to a pair of multi-part figures. It will be apparent that the present invention is applicable to different movements of a greater plurality of different figures so as to provide the effect of aligned and synchronized movements in the various viewing positions or movements of the device itself. It will be further understood that various changes and modifications may be made in the present invention without however departing from the spirit and scope thereof as set forth in the appended claims.

I claim:

1. A device of the character described comprising a spectacle frame provided with a pair of open lens frames and a bridge interconnecting said frames, and a composite blank complementary to said spectacle frame and shaped to form a pair of lenses and a bridge portion interconnecting said lenses, said composite blank being mounted in said frame with one of its lenses in each lens frame and with its bridge portion underlying the frame bridge, said composite blank comprising a first blank comprising a lenticular viewing screen and a complementary second blank underlying said first blank and provided with a multi-part figure within each lens frame, each multi-part figure being an open and a closed eye, said frame bridge being opaque and provided with means at its rear surface for receiving said bridge portion.

2. A device as in claim 1, said rear surface means being a recess in which said bridge portion is mounted.

References Cited in the file of this patent
UNITED STATES PATENTS

| | | |
|---|---|---|
| 2,832,593 | Anderson | Apr. 29, 1958 |
| 2,942,379 | Oman et al. | June 28, 1960 |